(12) United States Patent
Johnson

(10) Patent No.: US 10,578,476 B2
(45) Date of Patent: Mar. 3, 2020

(54) NON-CONTACT LEVEL SENSING FOR LOW DIELECTRIC CONSTANT INKS

(71) Applicant: 3D Systems, Inc., Rock Hill, SC (US)

(72) Inventor: David Walter Johnson, Tigard, OR (US)

(73) Assignee: 3D Systems, Inc., Rock Hill, SC (US)

( * ) Notice: Subject to any disclaimer, the term of this patent is extended or adjusted under 35 U.S.C. 154(b) by 146 days.

(21) Appl. No.: 15/958,427

(22) Filed: Apr. 20, 2018

(65) Prior Publication Data

US 2018/0326661 A1 Nov. 15, 2018

Related U.S. Application Data

(60) Provisional application No. 62/506,205, filed on May 15, 2017.

(51) Int. Cl.
| | |
|---|---|
| *G01F 23/26* | (2006.01) |
| *B29C 64/209* | (2017.01) |
| *B41J 2/085* | (2006.01) |
| *B29C 64/393* | (2017.01) |
| *B29C 64/112* | (2017.01) |
| *B29C 64/321* | (2017.01) |
| *B29C 64/259* | (2017.01) |

(Continued)

(52) U.S. Cl.
CPC .......... *G01F 23/263* (2013.01); *B29C 64/112* (2017.08); *B29C 64/209* (2017.08); *B29C 64/259* (2017.08); *B29C 64/321* (2017.08); *B29C 64/393* (2017.08); *B41J 2/085* (2013.01); *B41J 2/125* (2013.01); *B41J 2/175* (2013.01); *B41J 2/17566* (2013.01); *G01F 23/26* (2013.01); *G01F 23/268* (2013.01); *G01F 23/68* (2013.01); *B33Y 30/00* (2014.12); *B33Y 40/00* (2014.12); *B41J 2002/17576* (2013.01); *B41J 2002/17579* (2013.01)

(58) Field of Classification Search
CPC ...... G01F 23/26; G01F 23/263; G01F 23/268; G01F 23/68; B41J 2002/17579; B41J 2002/17576; B41J 2/17566
See application file for complete search history.

(56) References Cited

U.S. PATENT DOCUMENTS

| | | | |
|---|---|---|---|
| 7,258,005 B2 | 8/2007 | Nyce | |
| 2016/0041021 A1 | 2/2016 | Saitou et al. | |
| 2019/0126631 A1* | 5/2019 | Anderson | ............ B41J 2/17546 |

FOREIGN PATENT DOCUMENTS

| | | |
|---|---|---|
| RU | 2005999 C1 * | 1/1994 |
| WO | 2016042459 | 3/2016 |

* cited by examiner

*Primary Examiner* — Paul M. West

(57) ABSTRACT

A three dimensional (3D) printing system includes an ink cartridge providing ink to a printhead and a controller. The ink cartridge also includes a flag material and a sensor component. The ink has a low dielectric constant and defines an upper surface having a vertical position defining an ink level. The flag material has a high dielectric constant and is disposed upon the upper surface of the ink. The sensor component includes a vertical arrangement of electrodes proximate to the ink. The controller is coupled to the sensor electrodes and is configured to: (1) scan sensor electrodes to determine a capacitance between adjacent pairs of electrodes, (2) identify at least one pair of electrodes having a peak capacitance value relative to capacitance values of remaining pairs of electrodes, and (3) estimate the ink level based upon the identification.

14 Claims, 4 Drawing Sheets

(51) Int. Cl.
*B41J 2/175* (2006.01)
*B41J 2/125* (2006.01)
*G01F 23/68* (2006.01)
*B33Y 30/00* (2015.01)
*B33Y 40/00* (2020.01)

NON-CONTACT LEVEL SENSING FOR LOW DIELECTRIC CONSTANT INKS

CROSS REFERENCE TO RELATED APPLICATIONS

This non-provisional patent application claims priority to U.S. Provisional Application Ser. No. 62/506,205, Entitled "NON-CONTACT LEVEL SENSING FOR LOW DIELECTRIC CONSTANT INKS" by David Walter Johnson, filed on May 15, 2017, incorporated herein by reference under the benefit of 35 U.S.C. 119(e).

FIELD OF THE INVENTION

The present disclosure concerns an apparatus and method for fabrication of solid three dimensional (3D) articles of manufacture from the selective deposition of materials from an inkjet printhead. More particularly, the present disclosure concerns a simple and accurate way of tracking a level of ink being provided to the inkjet printhead.

BACKGROUND

Three dimensional (3D) printing systems are in rapidly increasing use for purposes such as prototyping and manufacturing. One type of 3D printer utilizes an inkjet printhead to selectively deposit a material to form a three dimensional (3D) article of manufacture. In some embodiments the 3D printer utilizes phase change or wax based inks.

The inks are provided to the 3D printer via the installation of ink containers or cartridges. One challenge is to accurately track an amount of ink remaining in a cartridge. Non-contact methods are preferred but can lose accuracy with certain ink formulations.

SUMMARY

Figure 1:
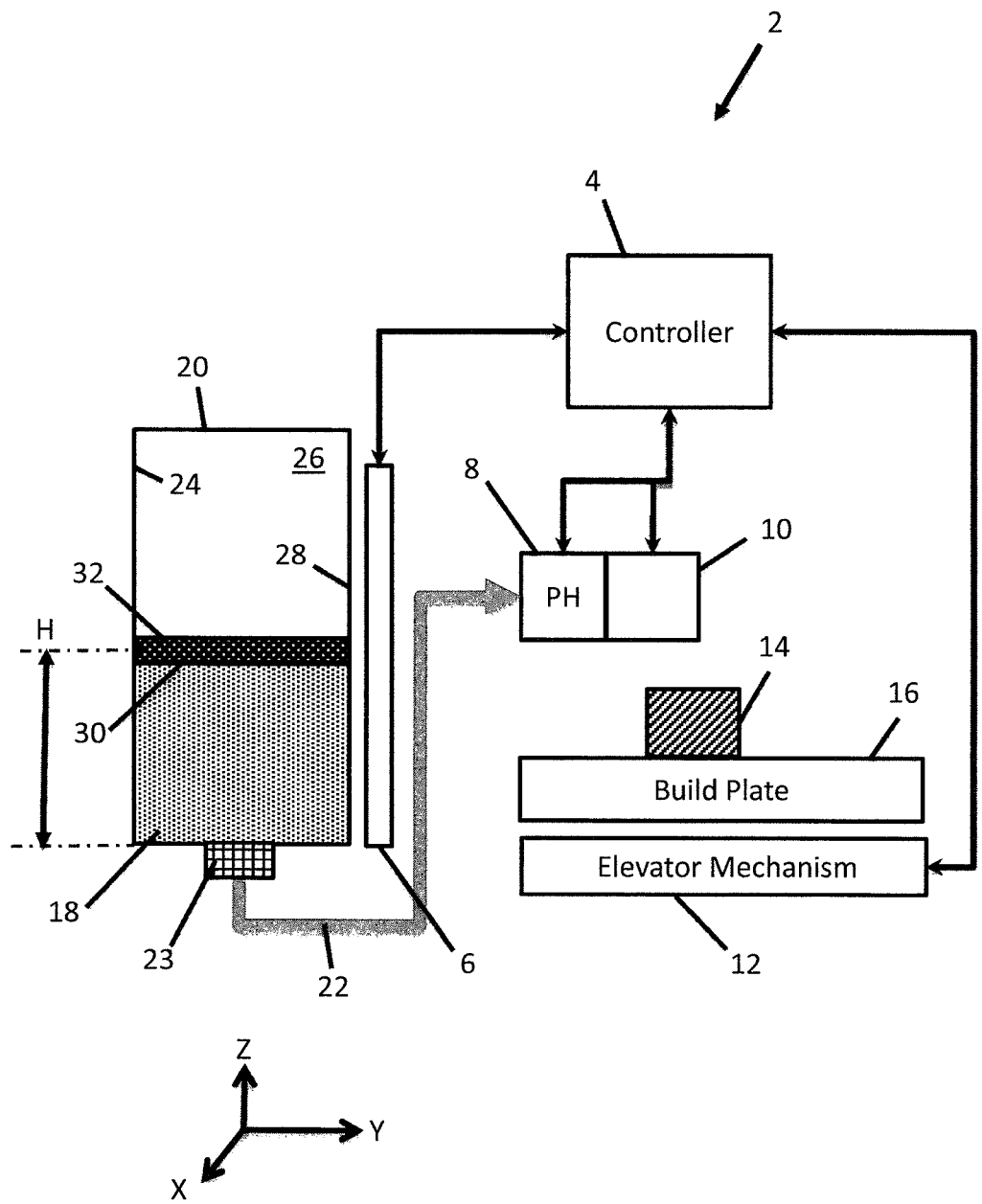
FIG. 1 is a schematic block diagram of an exemplary three dimensional printing system.

In an aspect of the disclosure, a three dimensional (3D) printing system includes an ink cartridge for providing ink to a printhead and a controller. The ink cartridge has an internal surface that defines a cavity having an essentially fixed volume. The ink cartridge also includes ink disposed within the cavity, a flag material, a sensor component, and a vertical wall separating the ink from the sensor component. The ink has a low dielectric constant and a free upper surface proximate to a boundary with air. The upper surface of the ink has a vertical position defining an ink level. The flag material is a chemically inert material (relative to the ink) with a high dielectric constant and is disposed upon the upper surface of the ink to provide a boundary between the upper surface and the air. The sensor component includes a vertical arrangement of electrodes that are proximate to the vertical wall and to the ink. The controller is coupled to the sensor electrodes and is configured to: (1) scan sensor electrodes to determine a capacitance between adjacent pairs of electrodes, (2) identify at least one pair of electrodes having a peak capacitance value relative to capacitance values of remaining pairs of electrodes, and (3) estimate the ink level based upon the identification of the at least one pair of electrodes.

In one implementation the controller includes a processor coupled to an information storage device. The information storage device includes a non-volatile or non-transient storage device storing instructions that, when executed by the processor, scan the sensor electrodes, control the elevator mechanism, control the printhead, control the movement mechanism, and control or receive information from other portions of the three dimensional printing system during the formation of a three dimensional article of manufacturing. The controller can be at one location or distributed among a plurality of locations in the printing system. In one embodiment the controller includes an external controller that is external to a print engine and an internal controller that is internal to the print engine.

In another implementation the ink has a dielectric constant of less than 6. The flag material has a dielectric constant of at least twice the dielectric constant of the ink. In referring to dielectric constants the dielectric constant of air is approximately one (1).

In yet another implementation the flag material has a dielectric constant of at least three times that of the ink. In yet further implementations the flag material has a dielectric constant of at least 3, 4, 5, 10, 20, or 30 times that of the ink.

In a further implementation the flag material has a dielectric constant of at least 10. In yet further implementations the flag material has a dielectric constant of at least 15, 20, 25, 30, 40, 50, or 60.

In another implementation the flag material includes a plurality of particles that float upon the upper surface of the ink. The particles have a dielectric constant that is at least twice the dielectric constant of the ink.

In yet another implementation the flag material includes a plurality of glass spheres that float upon the ink. The glass spheres can be coated with a conductive or high dielectric constant material. Examples of conductive materials include aluminum, gold, silver, and copper. For materials like copper or aluminum, the sphere may have protective outer coatings to prevent oxidation. Examples of high dielectric constant materials include strontium titanate, barium titanate, and titanium dioxide, to name a few examples.

In yet another implementation the flag material includes a discrete component that floats upon the ink. A guide feature guides the discrete component along the vertical planar wall of the ink container which separates the ink from the sensor.

DETAILED DESCRIPTION OF THE PREFERRED EMBODIMENTS

FIG. 1 is a schematic block diagram of an exemplary three dimensional printing system 2. In describing the three dimensional printing system 2, mutually orthogonal axes X, Y, and Z may be utilized. The axes X and Y will be referred to "lateral" or "horizontal" axes and Z will be described as a "vertical" axis. However, it is to be understood that Z is not necessarily perfectly aligned with a gravitational reference. Also X refers to a "scan" axis and Y refers to a "transverse" axis. The direction +Z is referred to as a generally "upward" direction and −Z is a generally "downward" direction.

Three dimensional printing system 2 includes a controller 4 coupled to a sensor 6, a printhead 8, a movement mechanism 10, and elevator mechanism 12. The controller controls the printhead 8, the movement mechanism 10, and the elevator mechanism 12 during fabrication of a three dimensional article of manufacture 14 upon build plate 16.

The elevator mechanism 12 supports, aligns, and vertically positions the build plate 16. The build plate 16 is typically formed from a rigid material such as aluminum and includes an upper surface upon which a three dimensional (3D) article of manufacture is to be formed. The rigidity is important so that accurate positional and dimensional tolerances can be achieved. The elevator mechanism 12 is configured to controllably position the build plate 16 along the vertical axis Z.

The movement mechanism 10 scans and positions the printhead 8 along lateral axes X and Y. As the printhead 8 scans along the lateral axes, it deposits drops of ink in a layerwise manner to form the three dimensional article of manufacture 14. In alternative embodiments the elevator mechanism 12 can translate the build plate 16 in two or more axes including one or more of the lateral axes X and Y. In some embodiments the printhead 8 can be fixed in location with no need for the movement mechanism 10.

While depositing ink the printhead 8 draws ink 18 from an ink container 20 along an ink supply path 22. The ink container has an inside surface 24 defining a cavity 26 containing the ink 18. Cavity 26 is essentially fixed in volume whereby air is drawn into cavity 26 as the ink 18 is depleted from container 20.

Ink container 20 also includes a filter element 23 that the ink passes through before passing through the ink supply path 22. The filter element 23 has a certain opening size to remove particles larger than the opening size that may adversely affect the ink supply path 22 or the printhead 8.

As the ink is depleted the controller 4 tracks a remaining amount of ink using sensor 6. Sensor 6 is disposed proximate to or upon a planar vertical wall 28 of the ink container 20. Sensor 6 is configured to enable the controller 4 to sense a capacitance as a function of height along the vertical axis Z. The capacitance is increased when a material having a higher dielectric constant than air is disposed proximate to the vertical wall 28.

The ink 18 has a dielectric constant that is higher than that of air. Thus, capacitance measurements as a function of Z will be higher below a top surface 30 of the ink 18 as compared to the measurements above the top surface 30. Air has a dielectric constant of about one (1). The ink, on the other hand, is a low dielectric ink having a dielectric constant of less than or equal to six (6). The printing system 2 may utilize a wax based ink that has a dielectric constant of about two (2). This difference in dielectric constant can be difficult to accurately detect using sensor 6.

To improve an accuracy for detecting the ink level, a flag material 32 is disposed upon the top surface 30 of the ink 18. This flag material 32 has a material property that enhances capacitive sensing of the ink level. The material property can be a dielectric constant that is at least twice that of the ink 18 and preferably at least five or at least ten times that of the ink 18. Alternatively the material property can include a degree of conductivity. Thus, as the ink 18 is depleted, sensor 6 can detect the level of the flag material 32 which provides a strong and accurate signal.

In one embodiment the flag material 32 includes a layer of particles that float upon the ink surface 30. The particles have a high dielectric constant and/or a conductive layer. In a second embodiment the flag material 32 can be a discrete floating device that is formed from or contains a high dielectric material. In a third embodiment a guide rail or other feature can be used to guide the flag material 32 along a path that is proximate to the planar vertical wall 28 when the flag material 32 is a discrete component.

In an exemplary embodiment the flag material 32 includes a plurality of hollow gas spheres. The glass spheres can be formed from a high dielectric constant glass. In some embodiments the hollow glass spheres can have a conductive or high dielectric coating which will increase the effective dielectric constant for the flag material 32. The coating can be silver or can be a multilayer coating such as aluminum plus a dielectric insulator. In one embodiment the openings in the filter element 23 are smaller than a diameter of the hollow glass spheres to prevent them from entering the fluid path 22 or the printhead 8.

Figure 2A:
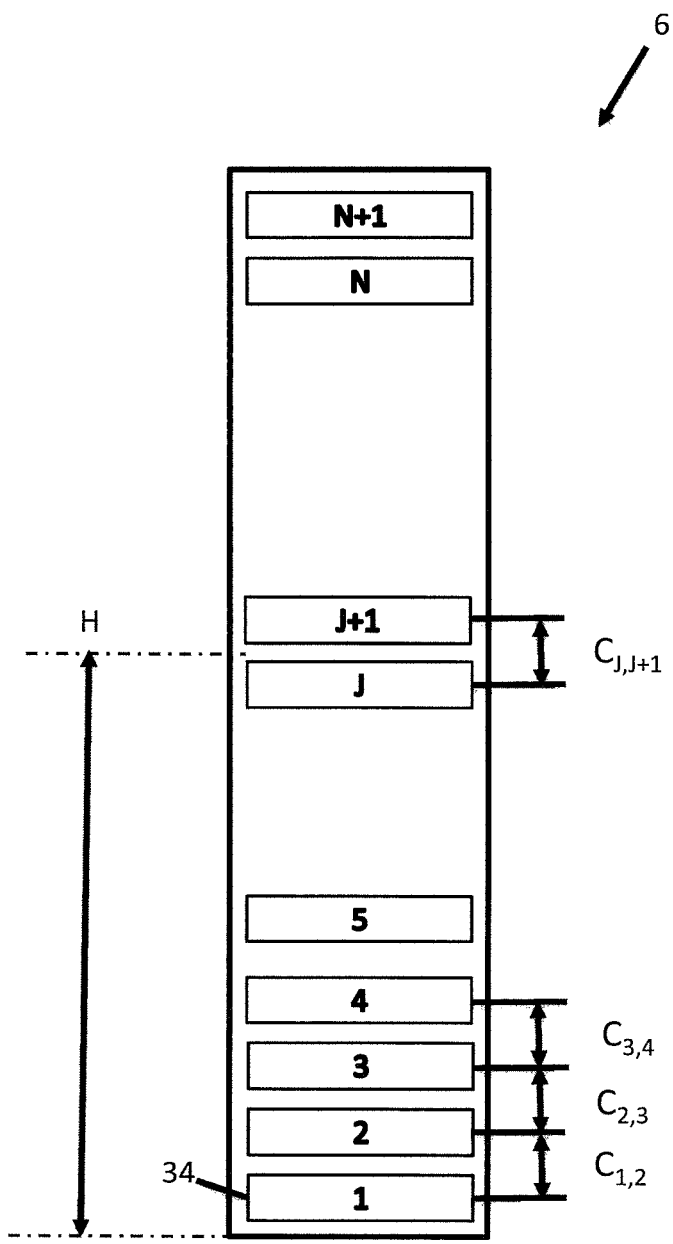
FIG. 2A is a first embodiment of a sensor 6.

FIG. 2A depicts a first embodiment of sensor 6. Sensor 6 includes a vertical arrangement of N+1 sensor electrodes 34 that are individually addressable by controller 4. Controller 4 is configured to measure a capacitance between the electrodes in a pairwise adjacent manner. In one embodiment the controller 4 "scans" the electrode 34 pairs from bottom to top starting with electrodes 1 and 2 and ending with electrodes N and N+1. The capacitance between electrodes 1 and 2 is indicated as $C_{1,2}$. The capacitance between electrodes 2 and 3 is indicated as $C_{2,3}$. The capacitance between electrodes N and N+1 is indicated as $C_{N,N+1}$.

The bottom of sensor 6 corresponds approximately to Z=0. A height of Z=H corresponds to a vertical position between electrodes J and J+1. In reference to FIG. 1, this is the height at which the flag material 32 is disposed. The capacitance $C_{J,J+1}$ will therefore be higher than the other values. The controller is configured to identify this peak capacitance value and thereby determine an estimate for H (which depends upon the value for J). The value of J is very roughly proportional to the value of H.

Suppose though that H lines up with an electrode-electrode J for the sake of example. Then the values $C_{J-1,J}$ and $C_{J,J+1}$ will both be approximately equal and will be higher than all the other values of C. Then the controller utilizes peak values of C and interpolation to estimate the height H.

Figure 2B:
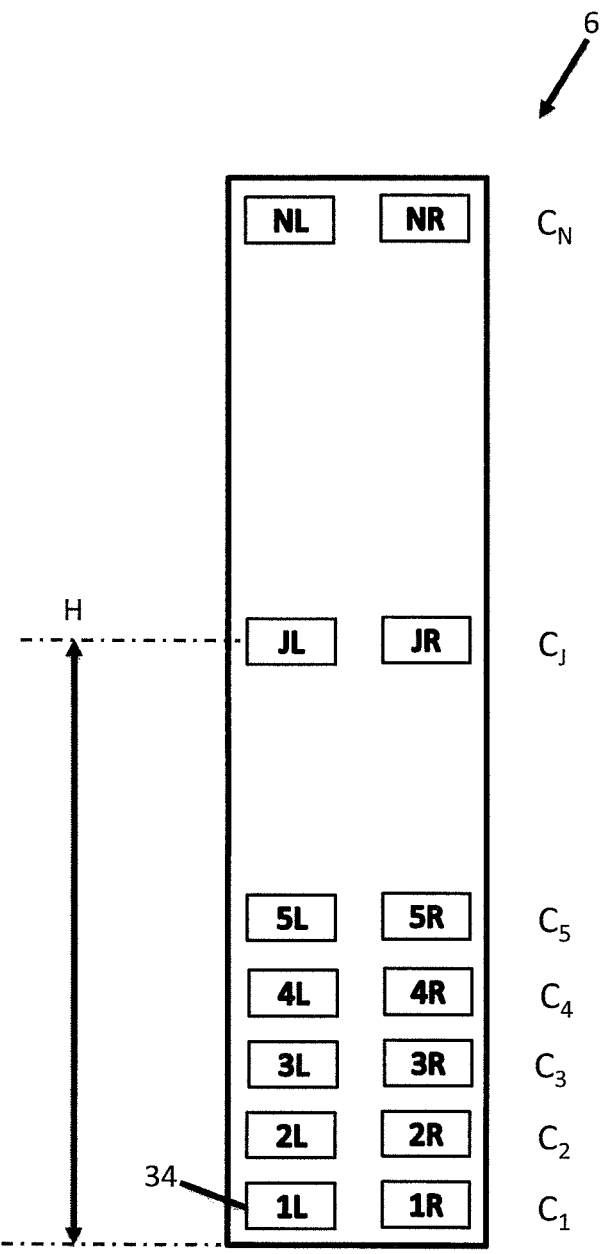
FIG. 2B is a second embodiment of a sensor 6.

FIG. 2B depicts a second embodiment of sensor 6. Sensor 6 includes a vertical arrangement of 2N electrodes 34 that are individually addressable by controller 4. Controller 4 is configured to measure a capacitance between horizontally adjacent or side by side pairs of the electrode 34. In one embodiment the controller scans the electrode 34 pairs from the bottom starting with electrodes 1L (one-left) and 1R (one-right) and ending with electrodes NL and NR. The capacitance between electrodes 1L and 1R is indicated as $C_1$. The capacitance between electrodes 2L and 2N is indicated as $C_2$. The capacitance between electrodes 2L and 2R is indicated as $C_2$. The capacitance between electrodes NL and NR is indicated as $C_N$.

The bottom of sensor 6 corresponds to Z=0. A height of Z=H corresponds to a vertical position of the electrode pair JL and JR. In reference to FIG. 1 this is a height at which the flag material 32 is disposed. The capacitance $C_J$ will therefore be higher than the other values. The controller is configured to identify this peak capacitance value and thereby determine an estimate for H (which depends upon the value for J). The value of J is very roughly proportional to the value of H.

For the sake of another example, suppose that H lines up somewhere between two pairs of electrodes such as J−1 and J. Then the values $C_{J-1}$ and $C_J$ will both be higher than all the other values of C. The controller can then estimate the position of H using an interpolation method—the level will be closer to the higher of the two values.

Other scanning methods are possible. For example, the controller 4 may scan electrodes 34 from the top to the bottom or in some other pattern. Alternatively if the controller 4 has data that suggests a certain ink level is more likely (from past measurements) then controller 4 can scan just the electrodes 34 that are likely to be more proximate to the flag material 32.

Yet other scanning methods are possible. For example, the controller 4 may measure capacitance values between vertical pairs of electrodes 34 such as between 4L and 5L. As another example, the controller 4 may measure capacitance between diagonal pairs such as 4L and 5R.

Other electrode 34 arrangements are possible. For example, the electrodes 34 can be slanted along X and Z. Also a tradeoff between a density of electrodes and signal strength can be optimized based upon a lateral Y-distance between the electrodes 34 and the flag material 32.

Figure 3:
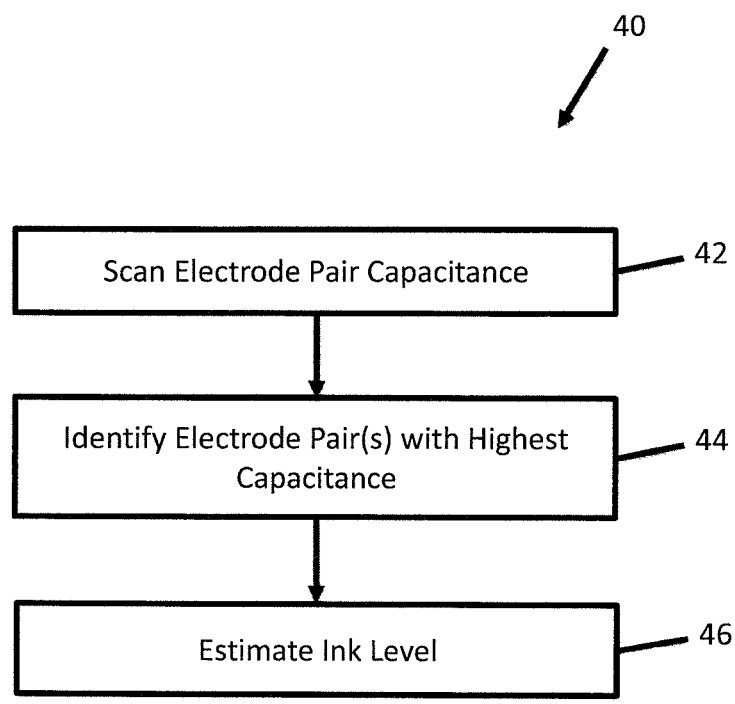
FIG. 3 is a flowchart depicting a method of determining an ink level.

FIG. 3 is a flowchart depicting an operational method for the controller 4 in determining the height H of ink 18 in container 20. According to step 42, the controller 4 scans electrodes 34 of sensor 6 to obtain capacitance values C between pairs of electrodes 34. According to step 44, the controller identifies electrode 34 pairs with the highest capacitance C values. According to step 46, the controller determines an ink level H based upon analyzing the capacitance C values. The value H corresponds to values of C that are the highest over the vertical arrangement of electrodes.

The specific embodiments and applications thereof described above are for illustrative purposes only and do not preclude modifications and variations encompassed by the scope of the following claims.

What is claimed:

1. A three dimensional printing system including:
   an ink cartridge having an internal surface defining a cavity further including:
      an ink having a low dielectric constant disposed within the cavity whereby a remaining quantity of ink defines an upper surface of the ink, the ink has a dielectric constant of less than 6;
      a flag material disposed upon the upper surface of the ink, the flag material having one of a high dielectric constant and a conductive property; and
      a sensor component including a vertical arrangement of sensor electrodes that are proximate to the ink; and
   a controller coupled to the sensor electrodes and configured to:
      scan the sensor electrodes to determine a capacitance between pairs of adjacent electrodes;
      identify at least one pair of electrodes having a peak capacitance relative to the remaining pairs of electrodes; and
      estimate a level of the ink based upon the identification of the at least one pair of electrodes.

2. The three dimensional printing system of claim 1 wherein the flag material has a dielectric constant of more than 10.

3. The three dimensional printing system of claim 1 wherein the flag material has a dielectric constant that is at least 3 times the dielectric constant of the ink.

4. The three dimensional printing system of claim 1 wherein the ink container includes a vertical wall separating the ink from the sensor.

5. A three dimensional printing system including:
   an ink cartridge having an internal surface defining a cavity further including:
      an ink having a low dielectric constant disposed within the cavity whereby a remaining quantity of ink defines an upper surface of the ink;
      a flag material disposed upon the upper surface of the ink, the flag material having one of a high dielectric constant and a conductive property; and
      a sensor component including a vertical arrangement of sensor electrodes that are proximate to the ink; and
   a controller coupled to the sensor electrodes and configured to:
      scan the sensor electrodes to determine a capacitance between pairs of adjacent electrodes;
      identify at least one pair of electrodes having a peak capacitance relative to the remaining pairs of electrodes; and
      estimate a level of the ink based upon the identification of the at least one pair of electrodes, the flag material includes a plurality of particles that float upon the ink.

6. The three dimensional printing system of claim 5 wherein the particles are hollow glass spheres having conductive coatings.

7. The three dimensional printing system of claim 5 wherein a filter element is disposed in a fluid path between the ink cartridge and a printhead, the filter element has a openings small enough to block passage of the particles to the fluid path.

8. A three dimensional printing system including:
   an ink cartridge having an internal surface defining a cavity further including:
      an ink having a low dielectric constant disposed within the cavity whereby a remaining quantity of ink defines an upper surface of the ink;
      a flag material disposed upon the upper surface of the ink, the flag material having one of a high dielectric constant and a conductive property; and
      a sensor component including a vertical arrangement of sensor electrodes that are proximate to the ink; and
   a controller coupled to the sensor electrodes and configured to:
      scan the sensor electrodes to determine a capacitance between pairs of adjacent electrodes;
      identify at least one pair of electrodes having a peak capacitance relative to the remaining pairs of electrodes; and
      estimate a level of the ink based upon the identification of the at least one pair of electrodes, the flag material is a discrete component, a guide feature guides the discrete component along a vertical planar wall of the ink container which separates the ink from the sensor.

9. An ink cartridge for providing ink to a printhead within a three dimensional printing system comprising:
   an outer housing having an inner surface defining a substantially fixed volume cavity and including a vertical outer wall;
   a low dielectric constant ink disposed within the cavity having a dielectric constant of less than six and having an upper surface;
   a flag material that floats upon the upper surface, the flag material having a material property that enhances capacitive sensing of the ink level, the material property including one or more of a high dielectric constant and a conductive material property; and
   a sensor disposed upon the outer vertical wall having a vertical arrangement of electrodes that is positioned proximate to the ink.

10. The ink cartridge of claim 9 wherein the flag material has a dielectric constant that is at least 3 times that of the ink.

11. The ink cartridge of claim 9 wherein the flag material includes a plurality of particles that float upon the ink.

12. The ink cartridge of claim 11 wherein the ink container further includes a filter element that fluidically separates the cavity from the printhead, the filter elements has openings that are smaller than the particles that float upon the ink.

13. The ink cartridge of claim 11 wherein the particles include glass spheres.

14. The ink cartridge of claim 13 wherein the glass spheres have conductive coatings to increase an effective capacitance measurement proximate to the flag material.

* * * * *